(12) United States Patent
Krumwiede

(10) Patent No.: US 6,455,452 B1
(45) Date of Patent: Sep. 24, 2002

(54) BRONZE PRIVACY GLASS

(75) Inventor: John F. Krumwiede, Cheswick, PA (US)

(73) Assignee: PPG Industries Ohio, Inc., Cleveland, OH (US)

(*) Notice: Subject to any disclaimer, the term of this patent is extended or adjusted under 35 U.S.C. 154(b) by 0 days.

(21) Appl. No.: 09/510,957

(22) Filed: Feb. 22, 2000

Related U.S. Application Data

(63) Continuation-in-part of application No. 09/042,500, filed on Mar. 16, 1998, now abandoned.

(51) Int. Cl.⁷ ............................ C03C 3/087; C03C 4/08; C03C 4/10
(52) U.S. Cl. ............................ 501/71; 501/70; 501/904; 501/905
(58) Field of Search ............................ 501/70, 71, 904, 501/905

(56) References Cited

U.S. PATENT DOCUMENTS

| | | | | |
|---|---|---|---|---|
| 3,296,004 A | * | 1/1967 | Duncan | 359/885 |
| 3,723,142 A | | 3/1973 | Kato et al. | 106/52 |
| 4,104,076 A | | 8/1978 | Pons | 106/52 |
| 4,339,541 A | | 7/1982 | Ruye | 501/71 |
| 4,381,934 A | | 5/1983 | Kunkle et al. | 65/135 |
| 4,792,536 A | | 12/1988 | Pecoraro et al. | 501/70 |
| 4,873,206 A | | 10/1989 | Jones | 501/71 |
| 4,886,539 A | | 12/1989 | Cerutti et al. | 65/135 |
| 5,023,210 A | | 6/1991 | Krumwiede et al. | 501/71 |
| 5,278,108 A | | 1/1994 | Cheng et al. | 501/71 |
| 5,308,805 A | | 5/1994 | Baker et al. | 501/71 |
| 5,346,867 A | | 9/1994 | Jones et al. | 501/71 |
| 5,352,640 A | | 10/1994 | Combes et al. | 501/71 |
| 5,380,685 A | | 1/1995 | Morimoto et al. | 501/71 |
| 5,393,593 A | | 2/1995 | Gulotta et al. | 428/220 |
| 5,411,922 A | | 5/1995 | Jones | 501/71 |
| 5,521,128 A | | 5/1996 | Jones et al. | 501/27 |
| 5,545,596 A | | 8/1996 | Casariego et al. | 501/71 |
| 5,582,455 A | | 12/1996 | Casariego et al. | 296/146.2 |
| 5,962,356 A | * | 10/1999 | Boulos et al. | 501/71 |

FOREIGN PATENT DOCUMENTS

| | | |
|---|---|---|
| CA | 2148954 | 11/1995 |
| EP | 0 452 207 | 10/1991 |
| EP | 0 536 049 | 10/1992 |
| EP | 0 705 800 | 4/1995 |
| EP | 0 803 479 | 10/1997 |
| EP | 0 816 296 | 1/1998 |
| FR | 2082647 | 12/1971 |
| FR | 2 331 527 | 7/1977 |
| FR | 2 731 696 | 9/1996 |
| GB | 2 304 709 | 3/1997 |
| GB | 2 304 711 | 3/1997 |
| JP | 57/106537 | 7/1982 |
| JP | 7-508971 | 10/1995 |
| JP | 8-165136 | 6/1996 |
| WO | WO 96/00194 | 1/1996 |
| WO | WO 97/17303 | 5/1997 |

* cited by examiner

*Primary Examiner*—Michael Marcheschi
(74) *Attorney, Agent, or Firm*—Kenneth J. Stachel; Andrew C. Siminerio

(57) ABSTRACT

The present invention provides a bronze colored, infrared and ultraviolet absorbing glass composition having a luminous transmittance of up to 60 percent. The glass uses a standard soda-lime-silica glass base composition and additionally iron and selenium, and optionally cobalt, as infrared and ultraviolet radiation absorbing materials and colorants. The glass of the present invention has a luminous transmittance (LTA) of up to 60 percent and its color is characterized by a dominant wavelength in the range of 560 to 590 nanometers and an excitation purity of 12 to 75% at a thickness of 0.160 inches (4.06 mm). In one embodiment of the invention, the glass composition of a bronze colored, infrared and ultraviolet radiation absorbing soda-lime-silica glass article includes a colorant portion having 0.7 to 2.2 percent by weight total iron, 0.15 to 0.5 percent by weight FeO, 3 to 100 PPM Se, and optionally up to 200 PPM CoO, and preferably 1.1 to 1.4 percent by weight total iron, 0.24 to 0.36 percent by weight FeO, 20 to 45 PPM Se, and 0 to 70 PPM CoO.

43 Claims, No Drawings

BRONZE PRIVACY GLASS

CROSS REFERENCE TO RELATED APPLICATION

This application is a continuation-in-part of U.S. application Ser. No. 09/042,500 filed Mar. 16, 1998 now abandoned.

BACKGROUND OF THE INVENTION

1. Field of the Invention

This invention relates to a bronze colored soda-lime-silica glass having a low luminous transmittance that makes it desirable for use as a privacy glazing in vehicles, such as the side and rear windows in vans or sun roofs for automotive vehicles. As used herein, the term "bronze colored" is meant to include glasses that have a dominant wavelength of 560 to 590 nanometers (nm) and may also be characterized as yellow green, yellow orange, or yellow gray in color. In addition, the glass should exhibit lower infrared and ultraviolet radiation transmittance when compared to typical bronze glasses used in automotive applications and be compatible with float glass manufacturing methods.

2. Technical Considerations and Prior Art

Various dark tinted, infrared and ultraviolet radiation absorbing glass compositions are known in the art. The primary colorant in typical dark tinted automotive privacy glasses is iron, which is usually present in both the $Fe_2O_3$ and FeO forms. Some glasses use cobalt, selenium and, optionally, nickel in combination with iron to achieve a desired color and infrared and ultraviolet radiation, for example, as disclosed in U.S. Pat. Nos. 4,873,206 to Jones; U.S. Pat. No. 5,278,108 to Cheng, et al.; U.S. Pat. No. 5,308,805 to Baker, et al.; U.S. Pat. No. 5,393,593 to Gulotta, et al.; U.S. Pat. Nos. 5,545,596 and 5,582,455 to Casariego, et al.; and European Patent Application No. 0 705 800. Others also include chromium with this combination of colorants as disclosed in U.S. Pat. No. 4,104,076 to Pons; U.S. Pat. No. 4,339,541 to Dela Ruye; U.S. Pat. No. 5,023,210 to Krumwiede, et al.; and U.S. Pat. No. 5,352,640 to Combes, et al.; European Patent Application No. 0 536 049; French Patent No. 2,331,527 and Canadian Patent No. 2,148,954. Patents such as U.S. Pat. Nos. 5,521,128 and 5,346,867 to Jones, et al. and U.S. Pat. No. 5,411,922 to Jones further includes manganese and/or titanium. Still, other glasses may include additional materials, such as disclosed in WO 96/00194, which teaches the inclusion of fluorine, zirconium, zinc, cerium, titanium and copper in the glass composition and requires that the sum of the alkaline earth oxides be less than 10 weight percent of the glass.

In producing infrared and ultraviolet radiation absorbing glasses, the relative amounts of iron and other additives must be closely monitored and controlled within an operating range to provide the desired color and spectral properties. It would be desirable to have a dark tinted bronze colored glass that may be used as a privacy glazing for vehicles to complement the bronze colored glasses available in automobiles and vans that exhibits superior solar performance properties and is compatible with commercial float glass manufacturing techniques.

SUMMARY OF THE INVENTION

The present invention provides a bronze colored, infrared and ultraviolet absorbing glass composition having a luminous transmittance of up to 60 percent. The glass uses a standard soda-lime-silica glass base composition and additionally iron and selenium, and optionally cobalt, as major colorants that contribute to infrared and ultraviolet radiation absorption. The glass of the present invention has a luminous transmittance (LTA) of up to 60 percent and its color is characterized by a dominant wavelength in the range of 560 to 590 nanometers and an excitation purity of 12 to 75 percent at a thickness of 0.160 inches (4.06 millimeters).

In one embodiment of the invention, the glass composition of a bronze colored, infrared and ultraviolet radiation absorbing soda-lime-silica glass article includes a major solar radiation absorbing and/or colorant portion having 0.7 to 2.2 percent by weight total iron, 0.15 to 0.5 percent by weight FeO, 3 to 100 PPM Se, and optionally up to 200 PPM CoO, and preferably 1.1 to 1.4 percent by weight total iron, 0.24 to 0.36 percent by weight FeO, 20 to 45 PPM Se, and 0 to 70 PPM CoO.

DETAILED DESCRIPTION OF THE INVENTION

As used in this specification and the appended claims, the following terms have the following general meanings:

"Visible light" means electromagnetic radiation from that portion of the electromagnetic radiation spectrum having a wavelength of from 380 nanometers to 750 nanometers ("nm"). (CIE Standard).

"Ultraviolet Radiation" and the acronym "UV" means electromagnetic radiation from that portion of the electromagnetic radiation spectrum having a wavelength of from about 290 nm to about 380 nm.

"Infrared", and "Infrared Radiation", and the acronym "IR" means electromagnetic radiation from that portion of the electromagnetic radiation spectrum having a wavelength of from about 750 nm to about 1,400 nm.

"Translucent", "Transparent" mean having the property of an article that some visible light is transmitted by at least a portion of the article even though the same article may absorb, reflect and/or transmit a minor amount of the visible light and/or some portion of the IR and/or UV radiation encountering at least a portion of the article.

"Solar Radiation Absorbing" means having the property of absorbing at least some portion or aspect of the electromagnetic radiation from UV, visible, and/or IR radiation.

"Infrared absorbing" means having the property of absorbing at least some portion or aspect of the electromagnetic radiation of IR radiation.

"Ultraviolet Absorbing" means having the property of absorbing at least some portion or aspect of the electromagnetic radiation of UV radiation.

"Solar Performance" is the property of absorbing sufficient IR and/or UV radiation to reduce the transmission of these types of radiation into an interior space to reduce heat build-up or reduce deterioration of objects within the interior space.

The base glass of the present invention, that is, the major constituents of the glass without infrared or ultraviolet absorbing materials and/or colorants, which are an object of the present invention, is commercial soda-lime-silica glass typically characterized as follows:

|           | Weight Percent |
| --------- | -------------- |
| $SiO_2$   | 66 to 75       |
| $Na_2O$   | 10 to 20       |
| CaO       | 5 to 15        |
| MgO       | 0 to 5         |
| $Al_2O_3$ | 0 to 5         |
| $K_2O$    | 0 to 5         |

As used herein, all "weight percent (wt. %)" values are based on the total weight of the final glass composition.

To this base glass, the present invention adds major infrared and ultraviolet radiation absorbing materials and/or colorants for the glass composition of the present invention in the form of at least iron and selenium and optionally cobalt. As disclosed herein with respect to the glass compositions, iron is expressed in terms of $Fe_2O_3$ and FeO, selenium is expressed in terms of elemental Se, and cobalt is expressed in terms of CoO. It should be appreciated that the glass compositions disclosed herein may include small amounts of other materials, for example, melting and refining aids, tramp materials or impurities. It should be further appreciated that in one embodiment of the invention, small amounts of additional materials may be included in the glass to provide the desired color characteristics and improve the solar performance of the glass, as will be discussed later in more detail. In one embodiment the transition metals and oxides for the major colorants comprise iron, selenium, and, optionally, cobalt, so that sheet or panel articles of the glass composition have most of the thickness of the sheet or panel comprised of the base glass above with these specific major colorants. Other minor colorants that may optionally be present include: chromium, vanadium, manganese, neodymium, zinc, molybdenum, cerium, and nickel and mixtures thereof in minor amounts to the major colorants. Such minor amounts are such that the total amount of the minor amounts of these materials would not alter the dominant wavelength to be outside the desired range of the dominant wavelength. Most preferably the glass composition is essentially free of other major colorants. The glass composition of the present invention is most preferably essentially free of materials added to the batch to result in the glass composition having fluorine, and oxides of zirconium, cerium, boron, and barium in more than trace amounts.

The iron oxides in a glass composition perform several functions. Ferric oxide, $Fe_2O_3$, is a strong ultraviolet radiation absorber and operates as a yellow colorant in the glass. Ferrous oxide, FeO, is a strong infrared radiation absorber and operates as a blue colorant. The total amount of iron present in the glasses disclosed herein is expressed in terms of $Fe_2O_3$ in accordance with standard analytical practice but that does not imply that all of the iron is actually in the form of $Fe_2O_3$. Likewise, the amount of iron in the ferrous state is reported as FeO, even though it may not actually be present in the glass as FeO. In order to reflect the relative amounts of ferrous and ferric iron in the glass compositions disclosed herein, the term "redox" shall mean the amount of iron in the ferrous state (expressed as FeO) divided by the amount of total iron (expressed as $Fe_2O_3$). Furthermore, unless stated otherwise, the term "total iron" in this specification shall mean total iron expressed in terms of $Fe_2O_3$ and the term "FeO" shall mean iron in the ferrous state expressed in terms of FeO.

Se is an ultraviolet absorbing colorant that imparts a pink or brown color to soda-lime-silica glass. Selenium may along with iron provide reddish-brown coloration. Se may also absorb some infrared radiation and its use tends to reduce redox. CoO operates as a blue colorant and does not exhibit any appreciable infrared or ultraviolet radiation absorbing properties. A proper balance between the iron, i.e. ferric and ferrous oxides, selenium, and cobalt is required to obtain the desired bronze colored privacy glass with the desired spectral properties.

The glass of the present invention may be melted and refined in a continuous, large-scale, commercial glass melting operation and formed into flat glass sheets of varying thickness by the float process in which the molten glass is supported on a pool of molten metal, usually tin, as it forms a ribbon shape and is cooled, in a manner well known in the art.

Although it is preferred that the glass disclosed herein be made using a conventional, overhead fired continuous melting operation, as is well known in the art, the glass may also be produced using a multi-stage melting operation, as disclosed in U.S. Pat. No. 4,381,934 to Kunkle, et al., U.S. Pat. No. 4,792,536 to Pecoraro, et al. and U.S. Pat. No. 4,886,539 to Cerutti, et al. If required, a stirring arrangement may be employed within the melting and/or forming stages of the glass production operation to homogenize the glass in order to produce glass of the highest optical quality.

Depending on the type of melting operation, sulfur may be added to the batch materials of a soda-lime-silica glass as a melting and refining aid. Commercially produced float glass may include up to about 0.3 wt. % $SO_3$. In a glass composition that includes iron and sulfur, providing reducing conditions may create amber coloration which lowers luminous transmittance as discussed in U.S. Pat. No. 4,792,536 to Pecoraro, et al. However, it is believed that the reducing conditions required to produce this coloration in float glass compositions of the type disclosed herein are limited to approximately the first 20 microns of the lower glass surface contacting the molten tin during the float forming operation, and to a lesser extent, to the exposed upper glass surface. Also it is possible that for a sheet of glass the $SnO_2$ can convert to $Sn^{2+}$ at the high temperature side of the sheet and to $Sn^{4+}$ at low temperature side. From this change in the valency, SnO2 can function as a reducing and fining agent in melting the glass. Additionally it is possible that the presence of the $SnO_2$ in the glass that contains Se and having a bronze tint, may affect the acceleration of pink coloration of Se and also decrease the ultraviolet transmission. Because of the glass' low sulfur content and/or the limited region of the glass in which any coloration could occur, depending on the particular soda-lime-silica-glass composition, sulfur in these surfaces essentially has little if any material effect on the glass color or spectral properties even if the effect could be measured. More suitably such an effect should not amount to altering the dominant wavelength of the glass more than around up to 3 to 5 nanometers.

It should be appreciated that as a result of forming the glass on molten tin as discussed above, measurable amounts of tin oxide may migrate into surface portions of the glass on the side contacting the molten tin. Typically, a piece of float glass has an $SnO_2$ concentration ranging from about 0.05 to 2 wt. % in about the first 25 microns below the surface of the glass that was in contact with the tin. Typical background levels of $SnO_2$ may be as high as 30 parts per million (PPM). It is believed that high tin concentrations in about the first 10 angstroms of the glass surface supported by the molten tin may slightly increase the reflectivity of that glass surface; however, the overall impact on the glass properties is minimal.

Table 1 illustrates examples of experimental glass melts having glass compositions which embody the principles of the present invention. Similarly, Table 2 illustrates a series of computer modeled glass compositions embodying the principles of the present invention. The modeled compositions were generated by a glass color and spectral performance computer model developed by PPG Industries, Inc. Tables 1 and 2 list only the iron, selenium and cobalt portions of the examples. Analysis of selected experimental melts indicates that it is expected that the melts would most likely include up to about 15 PPM $Cr_2O_3$, up to about 40 PPM $MnO_2$, and up to about 0.024 wt. percent $TiO_2$. It is presumed that the $Cr_2O_3$, $MnO_2$ and $TiO_2$ entered the glass melts as part of the cullet. In addition, the modeled compositions were modeled to include up to about 9 PPM $Cr_2O_3$ and about 0.025 wt. % $TiO_2$. It is believed that glass compositions of the instant invention produced by a commercial float process as discussed earlier may include these materials, but these levels of such materials are considered to be tramps levels which would not materially affect the color characteristics and spectral properties of the bronze glass of the present invention.

The spectral properties shown for Tables 1 and 2 are based on a reference thickness of 0.160 inches (4.06 mm). It should be appreciated that the spectral properties of the examples may be approximated at different thicknesses using the formulas disclosed in U.S. Pat. No. 4,792,536.

With respect to the transmittance data provided in Table 1, the luminous transmittance (LTA) is measured using C.I.E. standard illuminant "A" with a 2° observer over the wavelength range of 380 to 770 nanometers. Glass color, in terms of dominant wavelength and excitation purity, is measured using C.I.E. standard illuminant "C" with a 2° observer, following the procedures established in ASTM E308-90. The total solar ultraviolet transmittance (TSUV) is measured over the wavelength range of 300 to 400 nanometers, total solar infrared transmittance (TSIR) is measured over the wavelength range of 720 to 2000 nanometers, and total solar energy transmittance (TSET) is measured over the wavelength range of 300 to 2000 nanometers. The TSUV, TSIR and TSET transmittance data are calculated using Parry Moon air mass 2.0 direct solar irradiance data and integrated using the Trapezoidal Rule, as is known in the art. The spectral properties presented in Table 2 are based on the same wavelength ranges and calculation procedures.

Sample Preparation

The information provided in Table 1 is based on experimental laboratory melts having approximately the following batch components:

| | |
|---|---|
| cullet | 239.74 gm |
| sand | 331.10 gm |
| soda ash | 108.27 gm |
| limestone | 28.14 gm |
| dolomite | 79.80 gm |
| salt cake | 2.32 gm |
| $Fe_2O_3$ (total iron) | as required |
| Se | as required |
| $Co_3O_4$ | as required |

The raw materials were adjusted to produce a final glass weight of 700 grams. Reducing agents were added as required to control redox. The cullet used in the melts (which formed approximately 30% of the melt) included up to 0.51 wt. % total iron, 0.055 wt. % $TiO_2$ and 7 PPM $Cr_2O_3$. In preparing the melts, the ingredients were weighed out and mixed. A portion of the raw batch material was then placed in a silica crucible and heated to 2450° F. (1343° C.). When the batch material melted down, the remaining raw materials were added to the crucible and the crucible was held at 2450° F. (1343° C.) for 30 minutes. The molten batch was then heated and held at temperatures of 2500° F. (1371° C.), 2550° F. (1399° C.), 2600° F. (1427° C.) for 30 minutes, 30 minutes and 1 hour, respectively. Next, the molten glass was fritted in water, dried and reheated to 2650° F. (1454° C.) in a platinum crucible for two hours. The molten glass was then poured out of the crucible to form a slab and annealed. Samples were cut from the slab and ground and polished for analysis.

The chemical analysis of the glass compositions (except for FeO) was determined using a RIGAKU 3370 X-ray fluorescence spectrophotometer. The spectral characteristics of the glass were determined on annealed samples using a Perkin-Elmer Lambda 9 UV/VIS/NIR spectrophotometer prior to tempering the glass or prolonged exposure to ultraviolet radiation, which will effect the spectral properties of the glass. The FeO content and redox was determined using the glass color and spectral performance computer model developed by PPG Industries, Inc.

The following is the approximate basic oxides of the experimental melts disclosed in Table 1 calculated based on the batch:

| | |
|---|---|
| $SiO_2$ | 72.1 wt. % |
| $Na_2O$ | 13.6 wt. % |
| CaO | 8.8 wt. % |
| MgO | 3.8 wt. % |
| $Al_2O_3$ | 0.18 wt. % |
| $K_2O$ | 0.057 wt. % |

It is expected that the basic oxide constituents of commercial soda-lime-silica glass compositions based on the experimental melts disclosed in Table 1 and the modeled compositions disclosed in Table 2 would be similar to those discussed earlier.

TABLE 1

| | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| Total iron (wt. %) | 1.55 | 1.24 | 1.24 | 1.22 | 1.23 | 1.22 | 1.22 | 1.20 | 1.26 |
| FeO (wt. %) | 0.435 | 0.324 | 0.328 | 0.325 | 0.354 | 0.365 | 0.269 | 0.309 | 0.242 |
| Model redox | 0.280 | 0.262 | 0.265 | 0.266 | 0.287 | 0.299 | 0.220 | 0.257 | 0.192 |
| Se (PPM) | 44 | 45 | 49 | 40 | 34 | 28 | 30 | 37 | 31 |

TABLE 1-continued

|  |  |  |  |  |  |  |  |  |  |
|---|---|---|---|---|---|---|---|---|---|
| CoO (PPM) | 126 | 127 | 128 | 126 | 129 | 124 | 123 | 17 | 65 |
| LTA (%) | 13.76 | 17.39 | 18.21 | 19.70 | 20.06 | 22.11 | 25.04 | 31.72 | 32.36 |
| TSUV (%) | 4.27 | 6.57 | 7.07 | 8.32 | 9.47 | 11.23 | 11.00 | 9.26 | 10.10 |
| TSIR (%) | 6.42 | 11.81 | 11.81 | 11.74 | 10.18 | 9.51 | 16.81 | 13.32 | 19.75 |
| TSET (%) | 9.66 | 14.46 | 14.97 | 15.51 | 15.00 | 15.47 | 20.91 | 20.28 | 24.90 |
| DW (nm) | 579.4 | 580.3 | 580.2 | 578.5 | 578.0 | 572.8 | 576.9 | 580.4 | 577.5 |
| Pe (%) | 33.7 | 28.1 | 25.6 | 20.2 | 17.5 | 13.4 | 13.0 | 36.6 | 22.0 |

|  | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|
| Total iron (wt. %) | 1.23 | 1.20 | 1.25 | 1.24 | 1.24 | 1.22 | 1.19 | 1.22 | 1.19 |
| FeO (wt. %) | 0.312 | 0.329 | 0.333 | 0.267 | 0.290 | 0.316 | 0.297 | 0.330 | 0.318 |
| Model redox | 0.254 | 0.274 | 0.266 | 0.215 | 0.234 | 0.258 | 0.250 | 0.271 | 0.267 |
| Se (PPM) | 37 | 21 | 17 | 23 | 20 | 22 | 18 | 19 | 16 |
| CoO (PPM) | 0 | 32 | 35 | 35 | 35 | 0 | 34 | 0 | 0 |
| LTA (%) | 33.96 | 35.93 | 37.48 | 37.96 | 38.54 | 40.31 | 40.35 | 43.20 | 47.62 |
| TSUV (%) | 9.15 | 14.15 | 14.70 | 12.95 | 14.33 | 13.56 | 16.07 | 15.65 | 18.27 |
| TSIR (%) | 13.12 | 11.82 | 11.70 | 17.10 | 14.95 | 12.87 | 14.31 | 11.90 | 12.73 |
| TSET (%) | 20.97 | 21.89 | 22.57 | 25.67 | 24.82 | 23.73 | 25.41 | 24.58 | 27.24 |
| DW (nm) | 579.3 | 575.1 | 572.7 | 576.5 | 574.8 | 577.0 | 573.8 | 574.7 | 573.5 |
| Pe (%) | 35.8 | 18.9 | 15.5 | 21.2 | 17.7 | 26.0 | 15.7 | 20.7 | 17.4 |

TABLE 2

|  | Ex. 19 | Ex. 20 | Ex. 21 | Ex. 22 | Ex. 23 | Ex. 24 | Ex. 25 | Ex. 26 | Ex. 27 |
|---|---|---|---|---|---|---|---|---|---|
| Total iron (wt. %) | 0.72 | 0.72 | .075 | 0.72 | 2.1 | 1.9 | 1.75 | 1.45 | 1.35 |
| FeO (wt. %) | 0.202 | 0.202 | 0.298 | 0.202 | 0.557 | 0.504 | 0.464 | 0.384 | 0.348 |
| Model redox | 0.280 | 0.280 | 0.397 | 0.280 | 0.265 | 0.265 | 0.265 | 0.265 | 0.258 |
| Se (PPM) | 61 | 52 | 93 | 52 | 24 | 24 | 24 | 24 | 35 |
| CoO (PPM) | 190 | 175 | 50 | 126 | 35 | 35 | 35 | 35 | 0 |
| LTA (%) | 10.74 | 13.21 | 13.64 | 16.70 | 26.52 | 28.29 | 29.69 | 32.74 | 33.79 |
| TSUV (%) | 5.43 | 6.78 | 3.98 | 6.83 | 4.52 | 5.43 | 6.24 | 8.34 | 6.86 |
| TSIR (%) | 24.60 | 24.69 | 14.09 | 24.87 | 3.41 | 4.51 | 5.59 | 8.69 | 10.66 |
| TSET (%) | 19.13 | 20.31 | 14.13 | 21.64 | 12.33 | 13.85 | 15.19 | 18.52 | 19.46 |
| DW (nm) | 589.5 | 588.9 | 590.0 | 586.9 | 570.1 | 571.3 | 572.2 | 574.3 | 580.7 |
| Pe (%) | 31.7 | 25.5 | 70.3 | 35.1 | 25.0 | 24.0 | 23.4 | 21.9 | 41.4 |

|  | Ex. 28 | Ex. 29 | Ex. 30 | Ex. 31 | Ex. 32 | Ex. 33 | Ex. 34 | Ex. 35 |
|---|---|---|---|---|---|---|---|---|
| Total iron (wt. %) | 1.32 | 1.15 | 1.06 | 0.95 | 1.2 | 1.2 | 1.1 | 0.9 |
| FeO (wt. %) | 0.350 | 0.305 | 0.281 | 0.252 | 0.462 | 0.434 | 0.284 | 0.293 |
| Model redox | 0.265 | 0.265 | 0.265 | 0.265 | 0.385 | 0.362 | 0.258 | 0.325 |
| Se (PPM) | 24 | 24 | 24 | 24 | 18 | 18 | 20 | 18 |
| CoO (PPM) | 35 | 35 | 35 | 35 | 6 | 6 | 0 | 10 |
| LTA (%) | 34.16 | 36.12 | 37.20 | 38.58 | 40.33 | 41.12 | 46.28 | 55.34 |
| TSUV (%) | 9.50 | 11.30 | 12.42 | 13.97 | 17.44 | 16.74 | 12.67 | 26.07 |
| TSIR (%) | 7.58 | 13.71 | 15.77 | 18.75 | 5.67 | 6.62 | 15.56 | 14.80 |
| TSET (%) | 20.32 | 23.10 | 24.81 | 27.17 | 20.01 | 20.85 | 27.74 | 32.54 |
| DW (nm) | 575.2 | 576.6 | 577.4 | 578.5 | 570.5 | 572.0 | 577.4 | 561.0 |
| Pe (%) | 21.3 | 20.5 | 20.1 | 14.0 | 12.9 | 14.6 | 26.2 | 6.0 |

Referring to Tables 1 and 2, the present invention provides a bronze colored glass having a standard soda-lime-silica glass base composition and additionally iron and selenium, and optionally cobalt, as infrared and ultraviolet radiation absorbing materials and colorants and a luminous transmittance (LTA) of up to 60% and a color characterized by a dominant wavelength (DW) in the range of 560 to 590 nanometers (nm) and an excitation purity (Pe) of 12 to 75%. It is anticipated that the color of the glass may vary within the dominant wavelength range to provide a desired product. For example, as the dominant wavelength approaches 560 nanometers, the glass color may appear to be yellow green while as the dominant wavelength approaches 590 nanometers, the glass color may appear to be yellow orange. In addition, as the excitation purity gets smaller, the glass may appear to be more gray, while as the excitation purity increases, the color of the glass may appear more intense.

The redox ratio for the glass is maintained between 0.15 to 0.40, preferably between 0.18 to 0.30, more preferably between 0.24 to 0.29. The glass composition also has a TSUV of no greater than 40%, preferably no greater than 35%; a TSIR of no greater than 35%, preferably no greater than 30%; and a TSET of no greater than 40%, preferably no greater than 35%.

In one particular embodiment, the glass composition includes 0.7 to 2.2 wt. % total iron, preferably 1 to 1.6 wt. % total iron, and more preferably 1.1 to 1.4 wt. % total iron; 0.15 to 0.5 wt. % FeO, preferably 0.2 to 0.4 wt. % FeO, and more preferably 0.24 to 0.36 wt. % FeO; and 3 to 100 PPM Se, preferably 20 to 80 PPM Se, and more preferably 15 to 40 PPM Se. The glass has an LTA of up to 60% and a color characterized by a dominant wavelength of 571 to 590 nm, preferably 575 to 585 nm, and an excitation purity of 12 to 75%, preferably 15 to 35%, at a thickness of 0.16 inches (4.06 mm). As discussed earlier, cobalt may also be included in the glass composition and more specifically, 0 to less than 100 PPM CoO, preferably 0 to 70 PPM CoO, and more preferably 20 to 50 PPM CoO.

The following are additional embodiments of the present invention which combine the same infrared and ultraviolet radiation absorbing materials and colorants discussed above to produce a glass having the desired color characteristics and spectral properties.

A glass composition which includes 0.7 to 1.35 wt. % total iron, 0.15 to 0.5 wt. % FeO, 3 to 100 PPM Se, and 0 to less than 100 PPM CoO, and has an LTA of up to 60% and a color characterized by a dominant wavelength of 560 to 590 nm and an excitation purity of 12 to 75%, at a thickness of 0.16 inches (4.06 mm).

A glass composition which includes 0.7 to 2.2 wt. % total iron, 0.15 to 0.5 wt. % FeO, 3 to 100 PPM Se, and 0 to less than 100 PPM CoO and has an LTA of 20 to 60% and a color characterized by a dominant wavelength of 560 to 590 nm and an excitation purity of 12 to 75%, at a thickness of 0.16 inches (4.06 mm).

A glass composition which includes 0.7 to 2.2 wt. % total iron, 0.15 to 0.5 wt. % FeO, 3 to 100 PPM Se, and 0 to 200 PPM CoO and has an LTA of up to 60% and a color characterized by a dominant wavelength of 571 to 590 nm and an excitation purity of 15 to 75%, at a thickness of 0.16 inches (4.06 mm).

A glass composition which includes 0.7 to 1.35 wt. % total iron, 0.15 to 0.5 wt. % FeO, 3 to 100 PPM Se, and 0 to 200 PPM CoO and has an LTA of up to 60% and a color characterized by a dominant wavelength of 560 to 590 nm and an excitation purity of 15 to 75%, at a thickness of 0.16 inches (4.06 mm).

A glass composition which includes 0.7 to 2.2 wt. % total iron, 0.15 to 0.5 wt. % FeO, 3 to 100 PPM Se, and 0 to 200 PPM CoO and has an LTA of 20 to 60% and a color characterized by a dominant wavelength of 560 to 590 nm and an excitation purity of 15 to 75%, at a thickness of 0.16 inches (4.06 mm).

A glass composition which includes 0.7 to 1.35 wt. % total iron, 0.15 to 0.5 wt. % FeO, 3 to 100 PPM Se, and 0 to less than 100 PPM CoO and has an LTA of 20 to 60% and a color characterized by a dominant wavelength of 571 to 590 nm and an excitation purity of 15 to 75%, at a thickness of 0.16 inches (4.06 mm).

It is expected that the spectral properties of the glass will change after tempering the glass and further upon prolonged exposure to ultraviolet radiation, commonly referred to as "solarization". In particular, it is estimated that tempering and solarization of the glass compositions disclosed herein may reduce LTA and TSIR by about 0.5 to 1%, reduce the TSUV by about 1 to 2%, and TSET by about 1 to 1.5%. As a result, in one embodiment of the invention, the glass has selected spectral properties that initially fall outside the desired ranges previously discussed but fall within the desired ranges after tempering and/or solarization.

Glass as disclosed herein and made by the float process typically ranges from a sheet thickness of about 1 millimeter to 10 millimeters.

For vehicle glazing applications, it is preferred that -he glass sheets having a composition and spectral properties as disclosed herein have a thickness within the range of 0.126 to 0.197 inches (3.2 to 5 mm). It is anticipated that when using a single glass ply in the above thickness range, the glass will be tempered, e.g. for an automotive side or rear window.

It is also contemplated that the glass will have architectural applications and be used at thicknesses ranging from about 0.14 to 0.24 inches (3.6 to 6 mm).

When multiple plies are used for either automotive or architectural applications, it is anticipated that the glass plies will be annealed and laminated together using a thermoplastic adhesive, such as polyvinyl butyral.

As discussed earlier, one or more other materials may also be added to the glass compositions disclosed herein as to further reduce infrared and ultraviolet radiation transmission and/or control glass color in a minor way to that of the major colorants most of which also reduce infrared and ultraviolet radiation. The minor effect is because of the amount of these other materials present in the glass composition given their ability to reduce infrared or ultraviolet radiation or to effect the color of the glass composition. In particular, it is contemplated that the following materials may be added alone or in any combination to the major colorants of iron and selenium, and optionally cobalt containing soda-lime-silica glass disclosed herein:

| | |
|---|---|
| $Cr_2O_3$ | 0 to 0.009 wt. % |
| $TiO_2$ | 0 to 0.9 wt. % |
| $V_2O_5$ | 0 to 0.12 wt. % |
| $MnO_2$ | 0 to 1 wt. % |
| $Nd_2O_3$ | 0 to 1 wt. % |
| $SnO_2$ | 0 to 2 wt. % |
| ZnO | 0 to 1 wt. % |
| $MoO_3$ | 0 to 0.03 wt. % |
| $CeO_2$ | 0 to 2 wt. % |
| NiO | 0 to 0.1 wt. % |

As should be appreciated, adjustments may have to be made to the basic iron and selenium, and optionally cobalt constituents to account for any coloring and/or redox affecting power of these additional materials. For the foregoing list of materials the stated materials are expressed in the following manner: chromium $Cr_2O_3$, titanium $TiO_2$, vanadium $V_2O_5$, manganese $MnO_2$, niobium $Nd_2O_3$, tin $SnO_2$, zinc ZnO, molybdenum $MoO_3$, cerium $CeO_2$, and nickel NiO. When these materials are present a suitable total amount for them except for tin and cerium is from of 0 to 1% so long as the objects of the present invention are rot impaired.

Other variations as are known to those skilled in the art may be resorted to without departing from the scope of the invention as defined by the claims that follow.

I claim:

1. A bronze colored, infrared and ultraviolet radiation absorbing glass composition having a composition comprising:

a base glass portion comprising:

| | |
|---|---|
| $SiO_2$ | 66 to 75 percent by weight, |
| $Na_2O$ | 10 to 20 percent by weight, |
| CaO | 5 to 15 percent by weight, |
| MgO | 0 to 5 percent by weight, |
| $Al_2O_3$ | 0 to 5 percent by weight, |
| $K_2O$ | 0 to 5 percent by weight, | and a colorant portion consisting essentially of:

| total iron | 0.7 to 2.2 percent by weight, |
|---|---|
| FeO | 0.15 to 0.5 percent by weight, |
| Se | 3 to 100 PPM, and |
| CoO | 0 to less than 100 PPM, | the glass having a luminous transmittance (LTA) of up to 60 percent, and the color of the glass characterized by a dominant wavelength in the range of 571 to 590 nanometers and an excitation purity of greater than 12 to 75 percent for a thickness of 0.160 inches.

2. A bronze colored, infrared and ultraviolet radiation absorbing glass composition having a composition comprising:

a base glass portion comprising:

| $SiO_2$ | 66 to 75 percent by weight, |
|---|---|
| $Na_2O$ | 10 to 20 percent by weight, |
| CaO | 5 to 15 percent by weight, |
| MgO | 0 to 5 percent by weight, |
| $Al_2O_3$ | 0 to 5 percent by weight, |
| $K_2O$ | 0 to 5 percent by weight, | and major colorants comprising:

| total iron | 0.7 to 2.2 percent by weight, |
|---|---|
| FeO | 0.15 to 0.5 percent by weight, |
| Se | 3 to 100 PPM, and |
| CoO | 0 to less than 100 PPM, | the glass having a luminous transmittance (LTA) of up to 60 percent, and the color of the glass characterized by a dominant wavelength in the range of 571 to 590 nanometers and an excitation purity of 14.6 to 75 percent for a thickness of 0.160 inch.

3. The composition as in claim 2 wherein the total iron concentration is from 1 to 1.6 weight percent, the FeO concentration is 0.20 to 0.40 weight percent, and the Se concentration is 15 to 80 PPM.

4. The composition as in claim 3 wherein the CoO concentration is 0 to 70 PPM.

5. The composition as in claim 3 wherein the total iron concentration is from 1.1 to 1.4 weight percent, the FeO concentration is 0.24 to 0.36 weight percent, and the Se concentration is 20 to 45 PPM.

6. The composition as in claim 5 wherein the glass has a luminous transmittance (LTA) of 15 to 55 percent, a total solar ultraviolet transmittance (TSUV) of 40 percent or less, a total solar infrared transmittance (TSIR) of 35 percent or less and a total solar energy (TSET) transmittance of 40 percent or less, and the color of the glass is characterized by a dominant wavelength in the range of 575 to 585 nanometers and an excitation purity of 15 to 35 percent for a thickness of 0.160 inches.

7. The composition as in claim 6 wherein the glass has a luminous transmittance (LTA) of 25 to 50 percent, a total solar ultraviolet transmittance (TSUV) of 35 percent or less, a total solar infrared transmittance (TSIR) of 30 percent or less and a total solar energy (TSET) transmittance of 35 percent or less.

8. The composition as in claim 5 wherein the CoO concentration is 20 to 60 PPM.

9. A bronze colored, infrared and ultraviolet radiation absorbing glass composition having a composition comprising:

a base glass portion comprising:

| $SiO_2$ | 66 to 75 percent by weight, |
|---|---|
| $Na_2O$ | 10 to 20 percent by weight, |
| CaO | 5 to 15 percent by weight, |
| MgO | 0 to 5 percent by weight, |
| $Al_2O_3$ | 0 to 5 percent by weight, |
| $K_2O$ | 0 to 5 percent by weight, | and major colorants comprising:

| total iron | 1.1 to 1.4 percent by weight, |
|---|---|
| FeO | 0.24 to 0.36 percent by weight, |
| Se | 3 to 100 PPM, and |
| CoO | 20 to 45 PPM, | the glass having a luminous transmittance (LTA) of 15 to 55 percent, and a total solar ultraviolet transmittance (TSUV) of 40 percent or less, a total solar infrared transmittance (TSIR) of 35 percent or less and a total solar energy (TSET) transmittance of 40 percent or less, and the color of the glass is characterized by a dominant wavelength in the range of 575 to 505 nanometers and an excitation purity of 15 to 35 percent for a thickness of 0.160 inches.

10. The composition as in claim 2 wherein the glass has a total solar ultraviolet transmittance (TSUV) of 40 percent or less, a total solar infrared transmittance (TSIR) of 35 percent or less and a total solar energy transmittance (TSET) of 40 percent or less.

11. The composition as in claim 10 wherein the glass has a total solar ultraviolet transmittance (TSUV) of 35 percent or less, a total solar infrared transmittance (TSIR) of 30 percent or less and a total solar energy transmittance (TSET) of 35 percent or less.

12. A bronze colored, infrared and ultraviolet radiation absorbing glass composition having a composition comprising:

a base glass portion comprising:

| $SiO_2$ | 66 to 75 percent by weight, |
|---|---|
| $Na_2O$ | 10 to 20 percent by weight, |
| CaO | 5 to 15 percent by weight, |
| MgO | 0 to 5 percent by weight, |
| $Al_2O_3$ | 0 to 5 percent by weight, |
| $K_2O$ | 0 to 5 percent by weight, | and major colorants comprising;

| total iron | 0.7 to 2.2 percent by weight, |
|---|---|
| FeO | 0.15 to 0.5 percent by weight, |
| Se | 3 to 100 PPM, and |
| CoO | 0 to less than 100 PPM, | the glass having a luminous transmittance (LTA) of up to 60 percent, and the color of the glass is characterized by a dominant wavelength in the range of 575 to 585 nanometers and an excitation purity of 15 to 35 percent for a thickness of 0.160 inch.

13. The composition as in claim 2 wherein the glass has a luminous transmittance (LTA) of 15 to 55 percent.

14. The composition as in claim 13 wherein the glass has a luminous transmittance (LTA) of 25 to 45 percent.

15. A flat glass sheet made by a float process from the glass composition recited in claim 2.

16. An automotive window formed from the flat glass sheet of claim 15.

17. A bronze colored, infrared and ultraviolet radiation absorbing glass composition having a composition comprising:

a base glass portion comprising:

| | |
|---|---|
| $SiO_2$ | 66 to 75 percent by weight, |
| $Na_2O$ | 10 to 20 percent by weight, |
| CaO | 5 to 15 percent by weight, |
| MgO | 0 to 5 percent by weight, |
| $Al_2O_3$ | 0 to 5 percent by weight, |
| $K_2O$ | 0 to 5 percent by weight, | and a colorant portion consisting essentially of:

| | |
|---|---|
| total iron | 0.7 to 1.35 percent by weight, |
| FeO | 0.15 to 0.5 percent by weight, |
| Se | 3 to 100 PPM, and |
| CoO | 0 to less than 100 PPM, | the glass having a luminous transmittance (LTA) of up to 60 percent, and the color of the glass characterized by a dominant wavelength in the range of 561 to 590 nanometers and an excitation purity of greater than 12 to 75 percent for a thickness of 0.160 inches.

18. The composition as in claim 17 wherein the glass has a luminous transmittance (LTA) of 15 to 55 percent, a total solar ultraviolet transmittance (TSUV) of 40 percent or less, a total solar infrared transmittance (TSIR) of 35 percent or less and a total solar energy (TSET) transmittance of 40 percent or less, and the (color of the glass is characterized by a dominant wavelength in the range of 570 to 585 nanometers and an excitation purity of 15 to 35 percent for a thickness of 0.160 inches.

19. A bronze colored, infrared and ultraviolet radiation absorbing glass composition having a composition comprising:

a base glass portion comprising;

| | |
|---|---|
| $SiO_2$ | 66 to 75 percent by weight, |
| $Na_2O$ | 10 to 20 percent by weight, |
| CaO | 5 to 15 percent by weight, |
| MgO | 0 to 5 percent by weight, |
| $Al_2O_3$ | 0 to 5 percent by weight, |
| $K_2O$ | 0 to 5 percent by weight, | and a colorant portion consisting essentially of:

| | |
|---|---|
| total iron | 0.7 to 2.2 percent by weight, |
| FeO | 0.15 to 0.5 percent by weight, |
| Se | 3 to 100 PPM, and |
| CoO | 0 to less than 100 PPM, | the glass having a luminous transmittance (LTA) of 20 to 60 percent, and the color of the glass characterized by a dominant wavelength in the range of 561 to 590 nanometers and an excitation purity of greater than 12 to 75 percent and a total solar ultraviolet transmittance (TSUV) of 40 percent or less for a thickness of 0.160 inches.

20. The composition as in claim 19 wherein the glass has a luminous transmittance (LTA) of 25 to 40 percent, a total solar infrared transmittance (TSIR) of 35 percent or less and a total solar energy (TSET) transmittance of 40 percent or less, and the color of the glass is characterized by a dominant wavelength in the range of 570 to 585 nanometers and an excitation purity of 15 to 35 percent for a thickness of 0.160 inches.

21. A bronze colored, infrared and ultraviolet radiation absorbing glass composition having a composition comprising:

a base glass portion comprising:

| | |
|---|---|
| $SiO_2$ | 66 to 75 percent by weight, |
| $Na_2O$ | 10 to 20 percent by weight, |
| CaO | 5 to 15 percent by weight, |
| MgO | 0 to 5 percent by weight, |
| $Al_2O_3$ | 0 to 5 percent by weight, |
| $K_2O$ | 0 to 5 percent by weight, | and a colorant portion consisting essentially of:

| | |
|---|---|
| total iron | 0.7 to 2.2 percent by weight, |
| FeO | 0.15 to 0.5 percent by weight, |
| Se | 3 to 100 PPM, and |
| CoO | 0 to less than 100 PPM, | the glass having a luminous transmittance (LTA) of up to 60 percent, and the color of the glass characterized by a dominant wavelength in the range of 571 to 590 nanometers and an excitation purity of 15 to 75 percent for a thickness of 0.160 inches.

22. The composition as in claim 21 wherein the glass has a luminous transmittance (LTA) of 15 to 55 percent, a total solar ultraviolet transmittance (TSUV) of 40 percent or less, a total solar infrared transmittance (TSIR) of 35 percent or less and a total solar energy (TSET) transmittance of 40 percent or less, and the color of the glass is characterized by a dominant wavelength in the range of 575 to 585 nanometers and an excitation purity of 15 to 35 percent for a thickness of 0.160 inches.

23. A bronze colored, infrared and ultraviolet radiation absorbing glass composition having a composition comprising:

a base glass portion comprising:
  $SiO_2$ 66 to 75 percent by weight,

| | |
|---|---|
| $Na_2O$ | 10 to 20 percent by weight, |
| CaO | 5 to 15 percent by weight, |
| MgO | 0 to 5 percent by weight, |
| $Al_2O_3$ | 0 to 5 percent by weight, |
| $K_2O$ | 0 to 5 percent by weight, | and a colorant portion consisting essentially of:

| | |
|---|---|
| total iron | 0.7 to 1.35 percent by weight, |
| FeO | 0.15 to 0.5 percent by weight, |

| | |
|---|---|
| Se | 3 to 100 PPM, and |
| CoO | 0 to 200 PPM, | the glass having a luminous transmittance (LTA) of up to 60 percent, and the color of the glass characterized by a dominant wavelength in the range of 560 to 590 nanometers and an excitation purity of 15 to 75 percent for a thickness of 0.160 inches.

24. The composition as in claim 23 wherein the glass has a luminous transmittance (LTA) of 15 to 55 percent, a total solar ultraviolet transmittance (TSUV) of 40 percent or less, a total solar infrared transmittance (TSIR) of 35 percent or less and a total solar energy (TSET) transmittance of 40 percent or less, and the color of the glass is characterized by a dominant wavelength in the range of 570 to 585 nanometers and an excitation purity of 15 to 35 percent for a thickness of 0.160 inches.

25. A bronze colored, infrared and ultraviolet radiation absorbing glass composition having a composition comprising;

a base glass portion comprising:

| | |
|---|---|
| $SiO_2$ | 66 to 75 percent by weight, |
| $Na_2O$ | 10 to 20 percent by weight, |
| CaO | 5 to 15 percent by weight, |
| MgO | 0 to 5 percent by weight, |
| $Al_2O_3$ | 0 to 5 percent by weight, |
| $K_2O$ | 0 to 5 percent by weight, | and a colorant portion consisting essentially of;

| | |
|---|---|
| total iron | 0.7 to 2.2 percent by weight, |
| FeO | 0.15 to 0.5 percent by weight, |
| Se | 3 to 100 PPM, and |
| CoO | 0 to 200 PPM, | the glass having a luminous transmittance (LTA) of 20 to 60 percent, and the color of the glass characterized by a dominant wavelength in the range of 560 to 590 nanometers and an excitation purity of 15 to 75 percent and a total solar ultraviolet transmittance (TSUV) of 40 percent or less all for a thickness of 0.160 inches.

26. The composition as in claim 25 wherein the glass has a luminous transmittance (LTA) of 25 to 40 percent, a total solar infrared transmittance (TSIR) of 35 percent or less and a total solar energy (TSET) transmittance of 40 percent or less, and the color of the glass is characterized by a dominant wavelength in the range of 570 to 585 nanometers and an excitation purity of 15 to 35 percent for a thickness of 0.160 inches.

27. A bronze colored, infrared and ultraviolet radiation absorbing glass composition having a composition comprising:

a base glass portion comprising:

| | |
|---|---|
| $SiO_2$ | 66 to 75 percent by weight, |
| $Na_2O$ | 10 to 20 percent by weight, |
| CaO | 5 to 15 percent by weight, |
| MgO | 0 to 5 percent by weight, |
| $Al_2O_3$ | 0 to 5 percent by weight, |
| $K_2O$ | 0 to 5 percent by weight, | and a colorant portion consisting essentially of:

| | |
|---|---|
| total iron | 0.7 to 1.35 percent by weight, |
| FeO | 0.15 to 0.5 percent by weight, |
| Se | 3 to 100 PPM, and |
| CoO | 0 to less than 100 PPM, | the glass having a luminous transmittance (LTA) of 20 to 60 percent, and the color of the glass characterized by a dominant wavelength in the range of 571 to 590 nanometers and an excitation purity of 15 to 75 percent for a thickness of 0.160 inches.

28. The composition as in claim 27 wherein the glass has a luminous transmittance (LTA) of 25 to 40 percent, a total solar ultraviolet transmittance (TSUV) of 40 percent or less, a total solar infrared transmittance (TSIR) of 35 percent or less and a total solar energy (TSET) transmittance of 40 percent or less, and the color of the glass is characterized by a dominant wavelength in the range of 575 to 585 nanometers and an excitation purity of 15 to 35 percent for a thickness of 0.160 inches.

29. A bronze colored, infrared and ultraviolet radiation absorbing glass composition having a composition comprising:

a base glass portion comprising;

| | |
|---|---|
| $SiO_2$ | 66 to 75 percent by weight, |
| $Na_2O$ | 10 to 20 percent by weight, |
| CaO | 5 to 15 percent by weight, |
| MgO | 0 to 5 percent by weight, |
| $Al_2O_3$ | 0 to 5 percent by weight, |
| $K_2O$ | 0 to 5 percent by weight, | and a solar radiation absorbing and colorant portion consisting essentially of;

| | |
|---|---|
| total iron | 0.7 to 2.2 percent by weight, |
| FeO | 0.15 to 0.5 percent by weight, |
| Se | 3 to 100 PPM |
| CoO | 0 to less than 100 PPM, |
| $Cr_2O_3$ | 0 to 90 PPM, |
| $TiO_2$ | 0 to 0.9 percent by weight, |
| $V_2O_5$ | 0 to 0.12 percent by weight, |
| $MnO_2$ | 0 to 1 percent by weight, |
| $Nd_2O_3$ | 0 to 1 percent by weight, |
| $SnO_2$ | 0 to 2 percent by weight, |
| ZnO | 0 to 1 percent by weight, |
| $MoO_3$ | 0 to 0.03 percent by weight, |
| $CeO_2$ | 0 to 2 percent by weight, and |
| NiO | 0 to 0.1 percent by weight, | the glass having a luminous transmittance (LTA) of up to 60 percent, and the color of the glass characterized by a dominant wavelength in the range of 571 to 590 nanometers and an excitation purity of 14.6 to 75 percent for a thickness of 0.160 inches.

30. The composition as in claim 29 wherein the glass has a total solar ultraviolet transmittance (TSUV) of 40 percent or less, a total solar infrared transmittance (TSIR) of 35 percent or less and a total solar energy transmittance (TSET) of 40 percent or less.

31. A bronze colored, infrared and ultraviolet radiation absorbing glass composition having a composition comprising:

a base glass portion comprising;

| | |
|---|---|
| $SiO_2$ | 66 to 75 percent by weight, |
| $Na_2O$ | 10 to 20 percent by weight, |
| CaO | 5 to 15 percent by weight, |
| MgO | 0 to 5 percent by weight, |
| $Al_2O_3$ | 0 to 5 percent by weight, |
| $K_2O$ | 0 to 5 percent by weight, | and a colorant portion comprising:

| | |
|---|---|
| total iron | 0.7 to 2.2 percent by weight, |
| FeO | 0.15 to 0.5 percent by weight, |
| Se | 3 to 100 PPM |
| CoO | 0 to less than 100 PPM, |
| $Cr_2O_3$ | 0 to 90 PPM, |
| $TiO_2$ | 0 to 0.9 percent by weight, |
| $V_2O_5$ | 0 to 0.12 percent by weight, |
| $MnO_2$ | 0 to 1 percent by weight, |
| $Nd_2O_3$ | 0 to 1 percent by weight, |
| $SnO_2$ | 0 to 2 percent by weight, |
| ZnO | 0 to 1 percent by weight, |
| $MoO_3$ | 0 to 0.03 percent by weight, |
| $CeO_2$ | 0 to 2 percent by weight, and |
| NiO | 0 to 0.1 percent by weight, | such that the glass has a luminous transmittance (LTA) of up to 60 percent, and the color of the glass characterized by a dominant wavelength in the range of 575 to 585 nanometers and an excitation purity of 15 to 35 percent, where all of these are determined for a thickness of 0.160 inches.

32. The composition as in claim 31 wherein the glass has a total solar ultraviolet transmittance (TSUV) of 35 percent or less, a total solar infrared transmittance (TSIR) of 30 percent or less and a total solar energy transmittance (TSET) of 35 percent or less.

33. The composition as in claim 32 wherein the total iron concentration is from 1.0 to 1.6 weight percent, the FeO concentration is 0.2 to 0.4 weight percent, and the Se concentration is 15 to 80 PPM.

34. The composition as in claim 23 wherein the CoO concentration is 0 to 70 PPM.

35. A flat glass sheet made by a float process from the glass composition recited in claim 31.

36. A bronze colored, infrared and ultraviolet radiation absorbing glass composition having a composition comprising:

a base glass portion comprising:

| | |
|---|---|
| $SiO_2$ | 66 to 75 percent by weight, |
| $Na_2O$ | 10 to 20 percent by weight, |
| CaO | 5 to 15 percent by weight, |
| MgO | 0 to 5 percent by weight, |
| $Al_2O_3$ | 0 to 5 percent by weight, |
| $K_2O$ | 0 to 5 percent by weight, | and a colorant portion having major colorants comprising:

| | |
|---|---|
| total iron | 0.7 to 2.2 percent by weight, |
| FeO | 0.15 to 0.5 percent by weight, |
| Se | 3 to 100 PPM and |
| CoO | 0 to 200 PPM, | and minor colorants comprising:

| | |
|---|---|
| $Cr_2O_3$ | 0 to 90 PPM, |
| $TiO_2$ | 0 to 0.9 percent by weight, |
| $V_2O_5$ | 0 to 0.12 percent by weight, |
| $MnO_2$ | 0 to 1 percent by weight, |
| $Nd_2O_3$ | 0 to 1 percent by weight, |
| $SnO_2$ | 0 to 2 percent by weight, |
| ZnO | 0 to 1 percent by weight, |
| $MoO_3$ | 0 to 0.03 percent by weight, |
| $CeO_2$ | 0 to 2 percent by weight, and |
| NiO | 0 to 0.1 percent by weight, | the glass having a luminous transmittance (LTA) of up to 60 percent, and the color of the glass characterized by a dominant wavelength in the range of 571 to 590 nanometers and an excitation purity of 15 to 75 percent for a thickness of 0.160 inches.

37. The composition as in claim 36 wherein the glass absorbs solar radiation such that the glass has a total solar ultraviolet transmittance (TSUV) of 35 percent or less, a total solar infrared transmittance (TSIR) of 30 percent or less and a total solar energy transmittance (TSET) of 35 percent or less, and the color of the glass is characterized by a dominant wavelength in the range of 575 to 585 nanometers and an excitation purity of 15 to 35 percent.

38. The composition as in claim 1 which includes melting and refining aids.

39. The composition as in claim 1 which includes up to about 0.3 wt. $SO_3$ from the addition of sulfur to the batch material of a soda-lime glass.

40. The composition as in claim 1 wherein the composition includes $SnO_2$ concentration ranging from about 0.05 to 2 weight percent.

41. The flat glass sheet of claim 15 wherein the composition includes $SnO_2$ concentration ranging from about 0.05 to 2 weight percent and up to about 0.3 weight percent $SO_3$.

42. The flat glass sheet of claim 35 wherein the composition includes $SnO_2$ concentration ranging from about 0.05 to 2 weight percent and up to about 0.3 weight percent $SO_3$.

43. The composition as in claim 31 wherein the glass has a total solar ultraviolet transmittance (TSUV) of 40 percent or less, a total solar infrared transmittance (TSIR) of 35 percent or less and a total solar energy transmittance (TSET) of 40 percent or less.

* * * * *